(12) United States Patent
Siddiq (10) Patent No.: US 11,388,184 B2
(45) Date of Patent: Jul. 12, 2022

(54) NETWORK SECURITY SYSTEM AND METHOD FOR PREEMPTIVELY IDENTIFYING OR REMEDIATING SECURITY VULNERABILITIES

(71) Applicant: Saudi Arabian Oil Company, Dhahran (SA)

(72) Inventor: Irslan Siddiq, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 318 days.

(21) Appl. No.: 16/453,338

(22) Filed: Jun. 26, 2019

(65) Prior Publication Data

US 2020/0412757 A1 Dec. 31, 2020

(51) Int. Cl.
*H04L 9/40* (2022.01)
*G06N 20/00* (2019.01)

(52) U.S. Cl.
CPC ......... *H04L 63/1433* (2013.01); *G06N 20/00* (2019.01); *H04L 63/20* (2013.01)

(58) Field of Classification Search
CPC . H04L 63/1433; H04L 63/20; H04L 63/1425; G06N 20/00; G06F 21/552
See application file for complete search history.

(56) References Cited

U.S. PATENT DOCUMENTS

| 10,063,570 B2 | 8/2018 | Muddu et al. |
| 2017/0118235 A1 | 4/2017 | Reddy et al. |
| 2017/0220964 A1 | 8/2017 | Datta Ray |
| 2017/0279839 A1 | 9/2017 | Vasseur et al. |
| 2017/0324763 A1 | 11/2017 | Vasudevan et al. |
| 2018/0255084 A1* | 9/2018 | Kotinas ................ G06K 9/6218 |
| 2018/0295154 A1 | 10/2018 | Crabtree et al. |
| 2018/0324913 A1 | 11/2018 | Deng |

OTHER PUBLICATIONS

International Search Report and Written Opinion in Corresponding PCT Application No. PCT/US2020/039071 dated Sep. 3, 2020. 11 pages.
Ognawala, Saahil, et al. "Automatically assessing vulnerabilities discovered by compositional analysis" arXiv preprint arXiv: 1807.09160 (2018) (https://arxiv.org/pdf/1807.09160.pdf).
Balbix Vulnerability Management, Deeper Look: Risk-Based Vulnerability Management (2018).
Balbix Vulnerability Management (https://www.balbix.com/solutions/risk-based-vulnerability-management/).
International Preliminary Report on Patentability in Corresponding PCT Application No. PCT/US2020/039071 dated Dec. 28, 2021. 9 pages.

* cited by examiner

*Primary Examiner* — Beemnet W Dada
(74) *Attorney, Agent, or Firm* — Leason Ellis LLP (57) ABSTRACT

A system, a method, and a computer program for analyzing network security data from diverse data sources to predict and remediate a vulnerability at a node in a computer network, comprising receiving network security data from a plurality of data sources, extracting feature vectors from the received network security data, applying a machine learning model to the extracted feature vectors to generate a weighted vulnerability value, predicting a computing resource vulnerability at a node in the computer network based on the weighted vulnerability value, and transmitting the predicted computing resource vulnerability to a computing device which is configured to remediate the predicted computing resource vulnerability.

16 Claims, 6 Drawing Sheets

| IP ADDRESS | ASSET TYPE | SCANNED | VULNERABILITIES | LAST VULNERABLE | INTRANET | EXTRANET | INTERNET | APPLICATION TYPE |
|---|---|---|---|---|---|---|---|---|
| 10.1.X.1 | MODEM | N | N | 1/1/1900 | Y | N | N | NONE |
| 10.1.X.2 | SERVER | Y | Y | 2/15/2019 | Y | N | N | DATABASE |
| 10.1.X.3 | CAMERA | Y | N | 2/15/2016 | Y | N | N | NONE |
| 10.1.X.4 | SERVER | N | N | 1/1/1900 | Y | N | Y | WEB |
| 10.1.X.5 | SERVER | Y | N | 1/25/2013 | Y | N | N | ERP |
| 10.1.X.6 | UNKNOWN | N | N | 1/1/1900 | N | Y | N | UNKNOWN |

FIG. 6

NETWORK SECURITY SYSTEM AND METHOD FOR PREEMPTIVELY IDENTIFYING OR REMEDIATING SECURITY VULNERABILITIES

TECHNOLOGICAL FIELD OF THE DISCLOSURE

The present disclosure relates to a network security solution that includes a method, a system, and a computer program for preemptively identifying or remediating security vulnerabilities in a computer network.

BACKGROUND OF THE DISCLOSURE

Computer networks are continuously exposed to cyberattack threats, many of which can be catastrophic to a computer network or the entity that owns, controls or has valuable assets in the network, if successfully exploited. In enterprise computer networks with large footprints of computing resources, identification of security vulnerabilities can be a daunting task. This is because large organizations typically comprise large numbers of diverse computing resources, including servers, workstations, network devices, security appliances, IoT ("Internet of Things") devices, cameras, printers, software, and temporarily connected communicating resources. The problem is compounded many fold if the organization is distributed with computing resources in remote areas or different countries with distributed systems. Many times, identification and inventory of these computing resources or their types is not accurate or does not exist. Due to the absence of a clear and comprehensive picture of all computing resources in a given enterprise network, there is a good chance that a vulnerable computing resource will be missed during security assessments.

Additionally, for those computing resources in the enterprise network that are known, existing static vulnerability scanning solutions have significant limitations. These scanning solutions only work with known inventories of computing resources and known security vulnerabilities. If a computing resource has not been explicitly defined or is missing in a scanner's inventory, the solution will not scan that computing resource. Moreover, if a security vulnerability is not explicitly defined in the scanner's database, that vulnerability will not be detected. Furthermore, scanning solutions typically do not cover many computing resource types and, therefore, cannot scan those computing resources. The problem is even further exacerbated by existence of multiple security scanning solutions in the enterprise network that are provided by different vendors, which may not cover all types of computing resources in the network.

A major challenge facing enterprise computer networks is the absence of a network security solution that can accurately and preemptively identify substantially all vulnerable computing resources in a computer network. While vulnerability scanning solutions may be available for detecting security vulnerabilities in computer networks, such solutions are mainly static and work on an identified inventory of computing resources in a network. The solutions are not capable of preemptively detecting or identifying substantially all vulnerable computing resources or types of computing resources on a network. A computing resource that is not part of a scanning solution inventory could go unnoticed and could be a target of a cyberattack. The instant disclosure provides a network security solution that addresses these and other challenges in computer networks.

SUMMARY OF THE DISCLOSURE

According to a non-limiting embodiment of the disclosure, a method is provided for analyzing network security data from diverse data sources to predict and remediate a vulnerability at a node in a computer network. The method comprises receiving network security data from a plurality of data sources, extracting feature vectors from the received network security data, applying a machine learning model to the extracted feature vectors to generate a weighted vulnerability value, predicting a computing resource vulnerability at a node in the computer network based on the weighted vulnerability value, and transmitting the predicted computing resource vulnerability to a computing device which is configured to remediate the predicted computing resource vulnerability.

The method can further comprise evaluating the predicted computing resource vulnerability to determine whether it includes a false positive prediction.

The method can further comprise optimizing weighting in the machine learning model based on the extracted feature vectors when the predicted computing resource vulnerability is determined to include a false positive prediction.

The plurality of data sources can comprise at least one of a network firewall, a router, an intrusion prevention system, a vulnerability scanner, a dynamic asset discovery system, a static asset inventory manager, a security analyst communicating device, and a database.

Applying the machine learning model to the extracted feature vectors to generate the weighted vulnerability value can comprise generating a feature matrix that prioritizes feature vectors based on a risk to the node or the computer network that each feature vector represents. The feature matrix can comprise at least one of an IP address field, an asset type field, a scanned field, a vulnerabilities field, a last vulnerable field, an intranet field, an Internet field, and an application type field. An unknown value in the asset type field can be assigned a highest priority.

The feature matrix can include feature vectors for all connections to the node. The connections to the node can include a communication session that includes data packets transmitted to or from the node.

The IP address field can comprise an IP address of every computing resource connected to the node.

According to another non-limiting embodiment of the disclosure, a non-transitory computer readable storage medium is provided for storing network security analysis and vulnerability prediction program instructions that, when executed by one or more computers, cause a network security appliance to analyze network security data from diverse data sources to predict a vulnerability at a node in a computer network for remediation. The program instructions comprise the steps of receiving network security data from a plurality of data sources, extracting feature vectors from the received network security data, applying a machine learning model to the extracted feature vectors to generate a weighted vulnerability value, predicting a computing resource vulnerability at a node in the computer network based on the weighted vulnerability value, and transmitting the predicted computing resource vulnerability to a computing device which is configured to remediate the predicted computing resource vulnerability.

The program instructions can comprise the further step of evaluating the predicted computing resource vulnerability to determine whether it includes a false positive prediction, or optimizing weighting in the machine learning model based on the extracted feature vectors when the predicted computing resource vulnerability is determined to include a false positive prediction, or generating a feature matrix that prioritizes feature vectors based on a risk to the node or the computer network that each feature vector represents. The feature matrix can comprise at least one of an IP address field, an asset type field, a scanned field, a vulnerabilities field, a last vulnerable field, an intranet field, an Internet field, and an application type field. An unknown value in the asset type field can be assigned a highest priority. The feature matrix can include feature vectors for all connections to the node. The connections to the node can include a communication of data packets transmitted to or from the node. The IP address field can comprise an IP address of every computing resource connected to the node.

According to another non-limiting embodiment of the disclosure, a system is provided for analyzing network security data from diverse data sources to predict and remediate a vulnerability at a node in a computer network. The system comprises: a plurality of network security data sources that monitor and log activities and events in the computer network, the network security data sources including two or more of a network firewall, a router, an intrusion prevention system, a vulnerability scanner, a dynamic asset discovery system, and a static asset inventory manager; and a network security appliance that receives network security data from the plurality of data sources, extracts feature vectors from the received network security data, applies a machine learning model to the extracted feature vectors to generate a weighted vulnerability value, predicts a computing resource vulnerability at a node in the computer network based on the weighted vulnerability value, and transmits the predicted computing resource vulnerability to a computing device which is configured to remediate the predicted computing resource vulnerability.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

The present disclosure is further described in the detailed description that follows.

DETAILED DESCRIPTION OF THE DISCLOSURE

The present disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment may be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure may be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

By way of overview and introduction, the present disclosure provides a network security solution that can preemptively predict and identify vulnerable computing resources in a computer network. The network security solution includes gathering and classifying operational data from various data sources, including, for example, technology computing resource inventories, dynamic computing resource discovery outputs, vulnerability scanning reports, network device logs, routing tables, and intrusion protection system logs. The network security solution receives data from these various data sources, analyzes the received data, extracts features and converts the features to vectored format. After vectorization, a machine learning model can be applied to learn and predict vulnerable computing resources in the network. The list of potential vulnerable computing resources can be analyzed and investigated. The computing resources in the list can be prioritized so that more urgent or critical computing resources or security vulnerabilities are addressed first.

Figure 1:
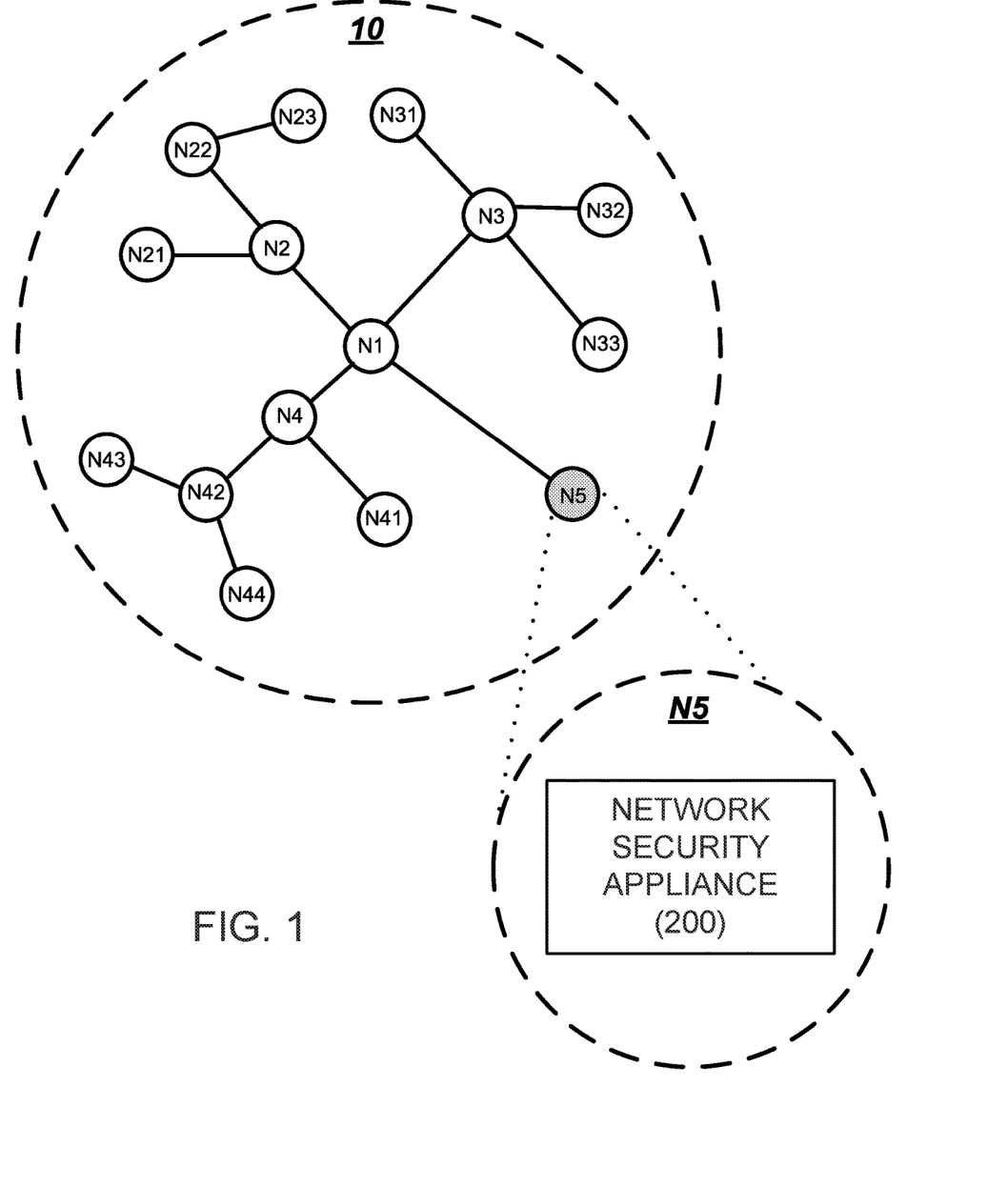
FIG. 1 shows an example of a computer network security provided with a network security solution, according to the principles of the disclosure.

FIG. 1 shows an example of a computer network 10 that is provided with the network security solution, according to the principles of the disclosure. The computer network 10 can include a private network, a private enterprise network, a corporate network, an academia network, a military network, or a government network. Any one or more of a plurality of nodes N in the network 10 can include a computing resource that can be connected to an external network (not shown), such as, for example, the Internet, or a communicating device (not shown) that is located internally or externally to the computer network 10. The computer network 10 can include a firewall (for example, network firewall 110, shown in FIG. 2). The network security solution includes a network security (NS) appliance 200, which can be included in one or more nodes N (for example, node N5) in the computer network 10.

As seen in FIG. 1, the computer network 10 can include a plurality of nodes N1, N2, N21, N22, N23, N3, N31, N32, N33, N4, N41, N42, N43, N44, and N5 (collectively or individually referred to as a node "N"). The NS appliance 200 can communicate with any one or more of the nodes N in the computer network 10, and can receive penetration testing data, vulnerability scanning report data, asset inventory data, dynamic asset discovery data, router data, intrusion protection system (IPS) data, and firewall data from data sources that are internal or external to the computer network 10. The NS appliance 200 can be implemented autonomously, without any human intervention.

Figure 2:
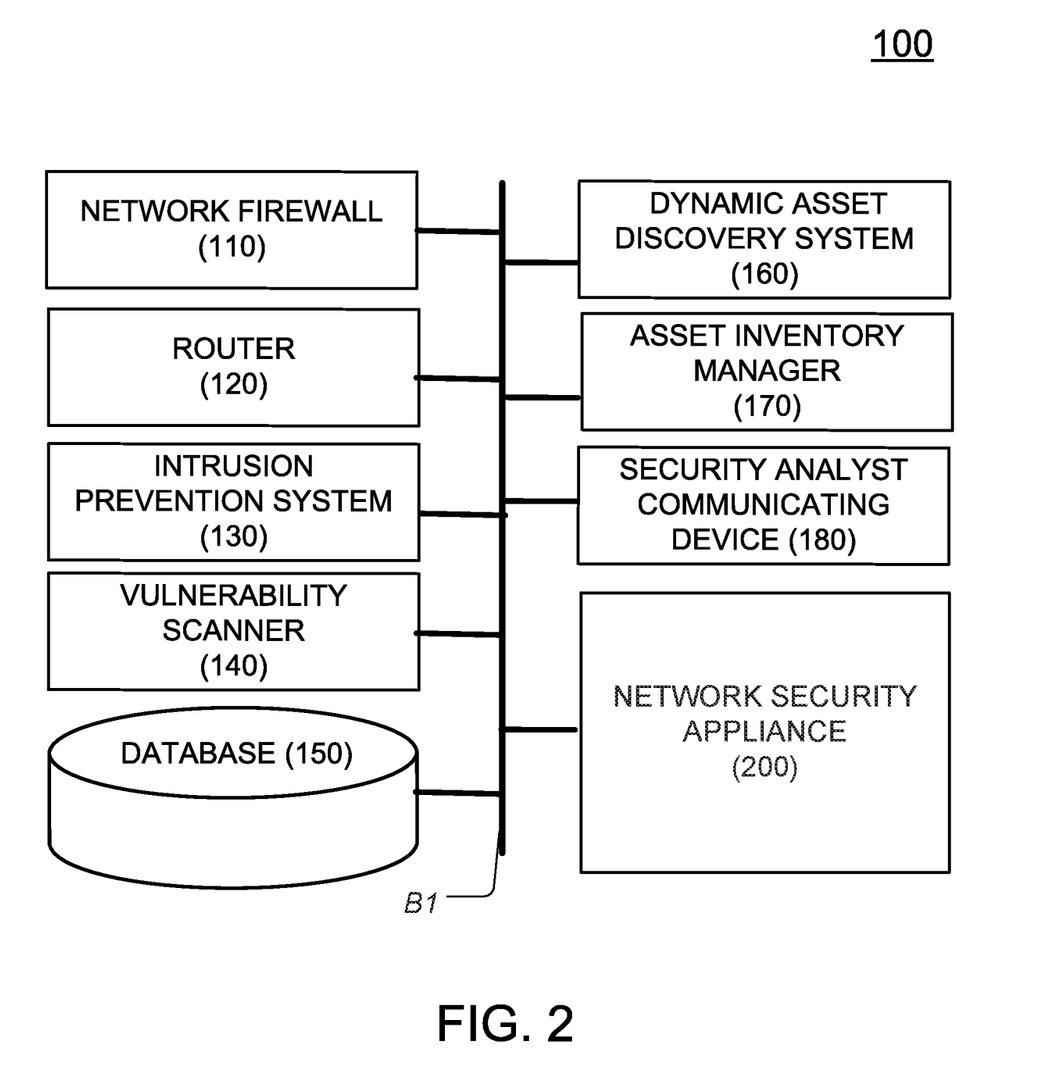
FIG. 2 shows an embodiment of a network security system that is configured according to the principles of the disclosure.

FIG. 2 shows an embodiment of a network security system 100 that is configured according to the principles of the disclosure. The network security system 100 includes the network security appliance 200. The network security system 100 can include additional hardware, firmware, or software that provides security analysis, malware protection, application visibility and control, reporting, secure mobility, and protection against threats that can arise relating to computing resources in the computer network 10.

The network security system 100 can include a network firewall 110, a router 120, an intrusion prevention system (IPS) 130, a vulnerability scanner 140, a database 150, a dynamic asset discovery (DAD) system 160, and a static asset inventory manager (SAIM) 170. The network security system 100 can include a security analyst communicating (SAC) device 180. The network security system 100 can include a backbone B1. Each of the components 110 to 180 can be connected to the backbone B1 by a communication link. The components 110 through 180 can be located at various nodes N in the computer network 10, or one or more of the components 110 to 180 can be collocated with or incorporated into the NS appliance 200. The network security system 100 can perform all security tasks for the computer network 10, including predicting vulnerabilities or attacks, detecting vulnerabilities, threats or attacks, preventing threats or attacks, monitoring computing resources, and responding to threats or attacks.

The network firewall 110 can monitor all data traffic incoming into or outgoing from the computer network 10 and log source and destination Internet protocol (IP) addresses, port numbers, and protocols. The network firewall 110 can monitor connections and data packets for all protocols used by the computer network 10, including transmission control protocol (TCP), user datagram protocol (UDP), Internet control message protocol (ICMP), simple mail transfer protocol (SMTP), or any other protocol for data packets transmitted to, from, or within the computer network 10. The network firewall 110 can log all connections or data packets that are blocked by the firewall, which can be stored as log data locally in the network firewall 110 or in the database 150. The log data can include event data such as, for example, disabled port openings, dropped data packets, dynamic port openings, firewall policies and rules, repeated unsuccessful access attempts by a communicating device having a particular IP address or group of IP addresses, outgoing connections from servers in the computer network 10, or any other event or data that might be useful in identifying vulnerable computing resources in the network.

The network firewall 110 can be configured to, or it can be accessed by the NS appliance 200 to transmit the firewall log data to the NS appliance 200. The log data can be transmitted as one or more computer files (such as, for example, W3C extend log format (.log) files) or a data feed (such as, for example, a rich site summary (RSS) data feed), which can be transmitted at time intervals that are of sufficient frequency or duration to capture and transmit all firewall log data for the computer network 10 to the NS appliance 200. The log data can include a header section comprising static, descriptive information about the log file or data, as well as available data fields, and a body section that includes compiled data relating to the data traffic that tried to cross the firewall. The log data can be transmitted to the NS appliance 200 as a dynamic list, continuously adding and transmitting most recent firewall log events as they occur in real-time.

The router 120 can include one or more routing tables, which can include routing table data such as, for example, source IP address, destination IP address, route distance, network topology, network-next hop (or gateway) mapping, and interface IP address. The router 120 can be configured to, or it can be accessed by the NS appliance 200 to transmit the routing table data to the NS appliance 200. The routing table data can be transmitted as one or more computer files or a data feed, which can be transmitted at time intervals that are of sufficient frequency or duration to capture and transmit all routing table data for the computer network 10 to the NS appliance 200.

The IPS 130 can be configured to monitor the computer network 10, including all computing resources at nodes N, for events that might indicate malicious activity or that violate a security policy. The IPS 130 can detect, log and report any suspect activities or violations in the computer network 10, including IP addresses of communicating devices involved in the event, port numbers, type of attack, name of attack, time of attack, number of attacks in a given time interval (for example, 1 hour or 24 hours), and any other data that can identify the source, destination, time, and nature of attack. The IPS 130 can be configured to prevent data packets from being delivered to a destination node or computing resource based on the contents of the particular data packets. In this regard, the IPS 130 can compare the contents of data packets against a ruleset that can include known threats. The ruleset can be stored locally or in, for example, the database 150. The IPS 130 can analyze data packet header or payload information. Upon detecting suspicious content, the IPS 130 can cause the suspect data packet to be rejected and the circumstances surrounding the event to be logged, including the information necessary to identify the IP destination address, source address, rule that was implicated, description of policy violation, and description of suspect activity.

The IPS 130 can determine and log whether an attack is malware (for example, virus, worm, Trojan horse, ransomware, or rootkit, bootkits, keyloggers, screen scrapers, logic bombs), access control (for example, breakdown of access control to access network), port scan, peer-to-peer (P2P), instant messaging (IM), denial of service (DoS), buffer overflow, or any other software or hardware attack on any one or more nodes N in the computer network 10.

The vulnerability scanner 140 can be configured to directly access each of the nodes N, determine computing resource configuration issues, missing security patches, cross-site scripting (XSS) injections, structured query language (SQL) injections, command injections, path traversal vulnerabilities, or any other detectable or known vulnerabilities in the computing resources. The vulnerability scanner 140 can record each vulnerability in a vulnerability scanning report as vulnerability scanning data. The vulnerability scanning data can include an identification of the applicable node, an IP address, a media access control (MAC) address, or any other data that can uniquely identify the applicable computing resource. The vulnerability scanning data can include a description of each vulnerability, type of vulnerability, time of scan, or any other information that might identify the vulnerability.

The dynamic asset discovery (DAD) system 160 can scan the nodes N in the computer network 10 periodically (or continuously), checking each node N to maintain a comprehensive, complete and accurate inventory of all computing resources in the network 10. This approach can provide a snapshot inventory of all computing resources in the computer network 10. For each computing node N in the network 10, the DAD system inventory data can include an IP address, type of computing resource, time of scan, state of the computing resource, or any other information that can identify the computing resource, the location of the computing resource, the type of computing resource, and the operating state of the computing resource.

Alternatively, the DAD system 160 can initiate a connection with a server (not shown) or application program interface (API) that manages the computing resources in the network 10 and receive periodic updates about changes in the network. While the discovery connection is active, the DAD system 160 can continue to discover and log computing resources as they go online (or offline) in the computer network 10. As the number, type, and state of computing resources in the computer network 10 fluctuates, the DAD system 160 can maintain a current and complete inventory of computing resources. The DAD system 160 can include a plurality of dynamic sites that update automatically based on dynamic asset discovery. These sites can be scanned to maintain the most current sets of computing resources.

The static asset inventory manager (SAIM) 170 can include an asset inventory of all nodes in the computer network 10. The SAIM 170 can provide a profile for each node N in the network 10. The SAIM 170 can communicate with the DAD system 160 to periodically update the SAIM asset inventory data, which can include the DAD system inventory data and historical data for all nodes in the computer network 10. The SAIM asset inventory data can include related data for each node N, including configuration, policies, rules, hardware, software, contracts, purchase orders, licenses, warranties, and security features (for example, malware protection, antivirus, status of software patches, types of vulnerabilities scans performed, vulnerability scan date, vulnerability scan results, and security remediation performed).

The security analyst communicating (SAC) device 180 can include a communicating device at a security analyst location in (or external to) the computer network 10. The SAC device 180 can perform security vulnerability scanning of one or more nodes N in the network 10 and generate vulnerability scanning data that summarizes the results of the scanning. The SAC device 180 can perform, for example, penetration testing of one or more computing resources in the network 10 and identify security vulnerabilities, which can be logged in a SAC report that includes, for each scanned node N, an IP address, a description of the computing resource, type of computing resource, time of scan, description of penetration testing performed, type of security vulnerability discovered, description of discovered vulnerability, description of remediation (if any) performed, and time of remediation (if any).

Each of the IPS 130, vulnerability scanner 140, DAD system 160, SAIM 170, and SAC device 180 can be configured to, or it can be accessed by the NS appliance 200 to transmit IPS log data, vulnerability data, DAD system inventory data, SAIM inventory data, and SAC device report data, respectively, to the NS appliance 200 as one or more computer files or data feeds. The data can be transmitted periodically or continuously.

Figure 3:
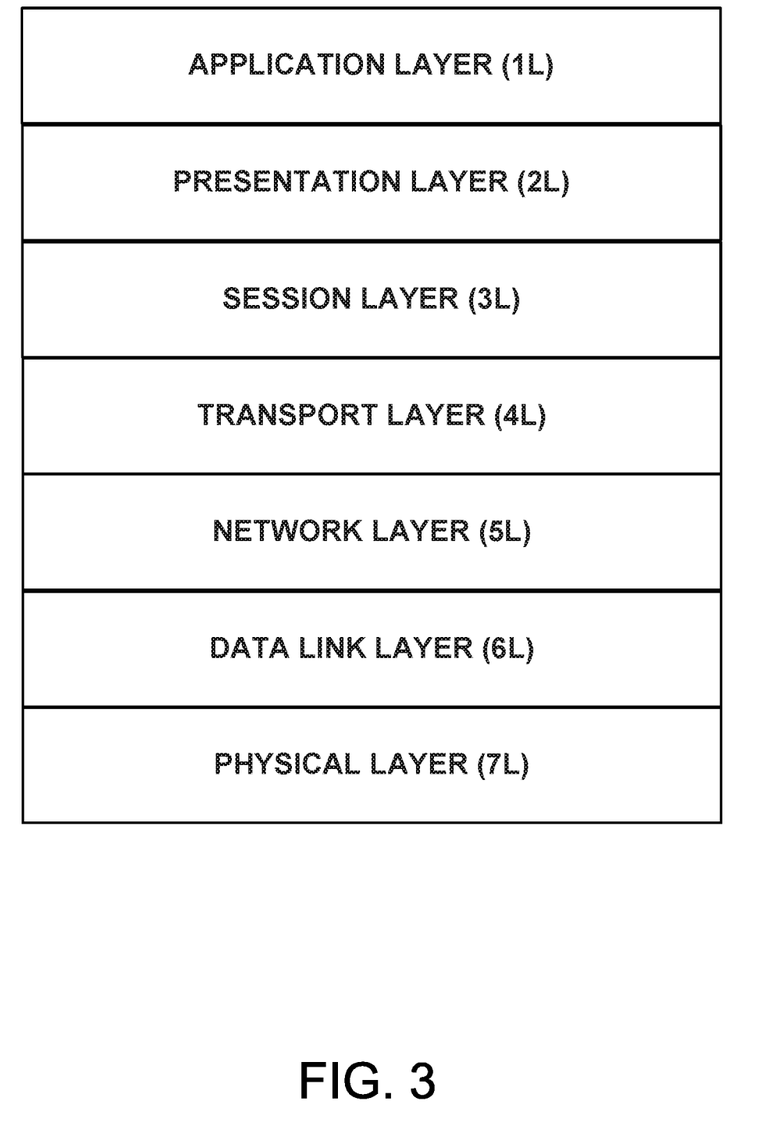
FIG. 3 shows the seven-layer Open Systems Interconnection (OSI) model implemented in the disclosure.

FIG. 3 shows the seven-layer OSI model. The application layer 1L is the OSI layer in a computing resource that is closest to the user. The application layer 1L interacts with software applications in the communicating device that implement a communicating component. The application layer 1L can include an email application interface, such as, for example, MICROSOFT® OUTLOOK® or any enterprise email interface that an end user can interact with to, for example, receive, open, read, create, or send an email to a communicating device in the computer network 10 or a communicating devices (not shown) external to the computer network 10.

The presentation layer 2L establishes context between software applications, which might use different syntax and semantics. The presentation layer 2L transforms data into a form that each software application can accept. An operating system is an example of the presentation layer 2L.

The session layer 3L controls the communication connections between computing resources in the computer network 10 or between a computing resource in the network and computing resources external to the computer network 10. This layer is responsible for establishing, managing and terminating connections between local and remote applications. The layer can provide for full-duplex, half-duplex, or simplex operations, and is responsible for establishing checkpointing, adjournment, termination, and restart procedures.

The transport layer 4L provides the functional and procedural mechanisms for transferring variable-length data sequences from a source computing device to a destination computing device, while maintaining quality-of-service (QoS). The transport layer 4L controls the reliability of a given link through flow control, segmentation and desegmentation, and error control. The transport layer 4L can include, for example, tunneling protocols, the Transmission Control Protocol (TCP) and the User Datagram Protocol (UDP).

The network layer 5L provides the functional and procedural mechanisms for transferring data packets from a computing resource in a network (for example, a LAN) to another computing resource on a different network (for example, a different LAN). If the data to be transmitted is too large, the network layer 5L can facilitate splitting the data into a plurality of segments at the node and sending the fragments independently to the other node, where the segments can be reassembled to recreate the transmitted data. The network layer 5L can include one or more layer-management protocols such as, for example, routing protocols, multicast group management, network layer information and error, and network layer address assignment.

The link layer 6L is responsible for node-to-node transfer between computing devices in a communication system. In IEEE 802 implementations, the link layer 6L is divided into two sublayers, consisting of a medium access control (MAC) layer and a logical link control (LLC) layer. The MAC layer is responsible for controlling how devices in a network gain access to a medium and permission to transmit data. The LLC layer is responsible for identifying and encapsulating network layer protocols, and for controlling error checking and frame synchronization.

The physical layer 7L includes the hardware that connects the communicating devices in the computer network 10. The hardware can include for example connectors, cables, switches, and the like, that provide for transmission and reception of instruction and data streams between the communicating devices.

Figure 4:
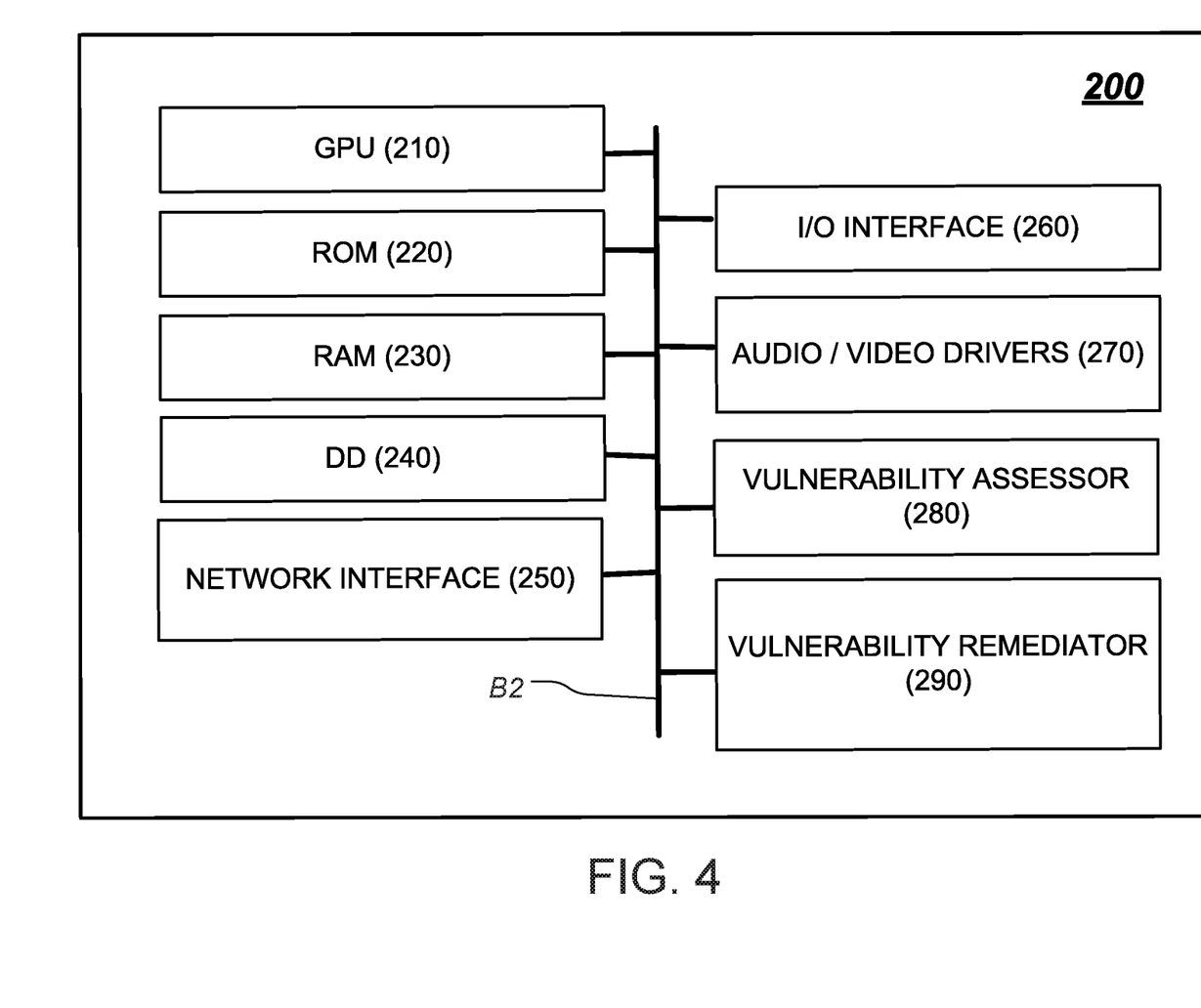
FIG. 4 an architecture of an embodiment of a network security appliance that can be included in the network security solution shown in FIG. 1 or the network security system shown in FIG. 2.

FIG. 4 shows an architecture of a non-limiting embodiment of the NS appliance 200, according to the principles of the disclosure. The NS appliance 200 can include a graphic processor unit (GPU) 210, a read-only memory (ROM) 220, a random-access memory (RAM) 230, a disk drive (DD) 240, a network interface 250, an input-output (I/O) interface 260, audio and video drivers 270, a security vulnerability assessor 280, and a vulnerability remediator 290, each of which can be connected to a backbone B2 by means of a communication link. The NS appliance 200 can be included in a server (not shown) located, for example, at node N5 (shown in FIG. 1).

The GPU 210 can include any of various commercially available graphic processors, processors, microprocessors or multi-processor architectures. The GPU 210 can be a central processing unit (CPU).

Figure 5:
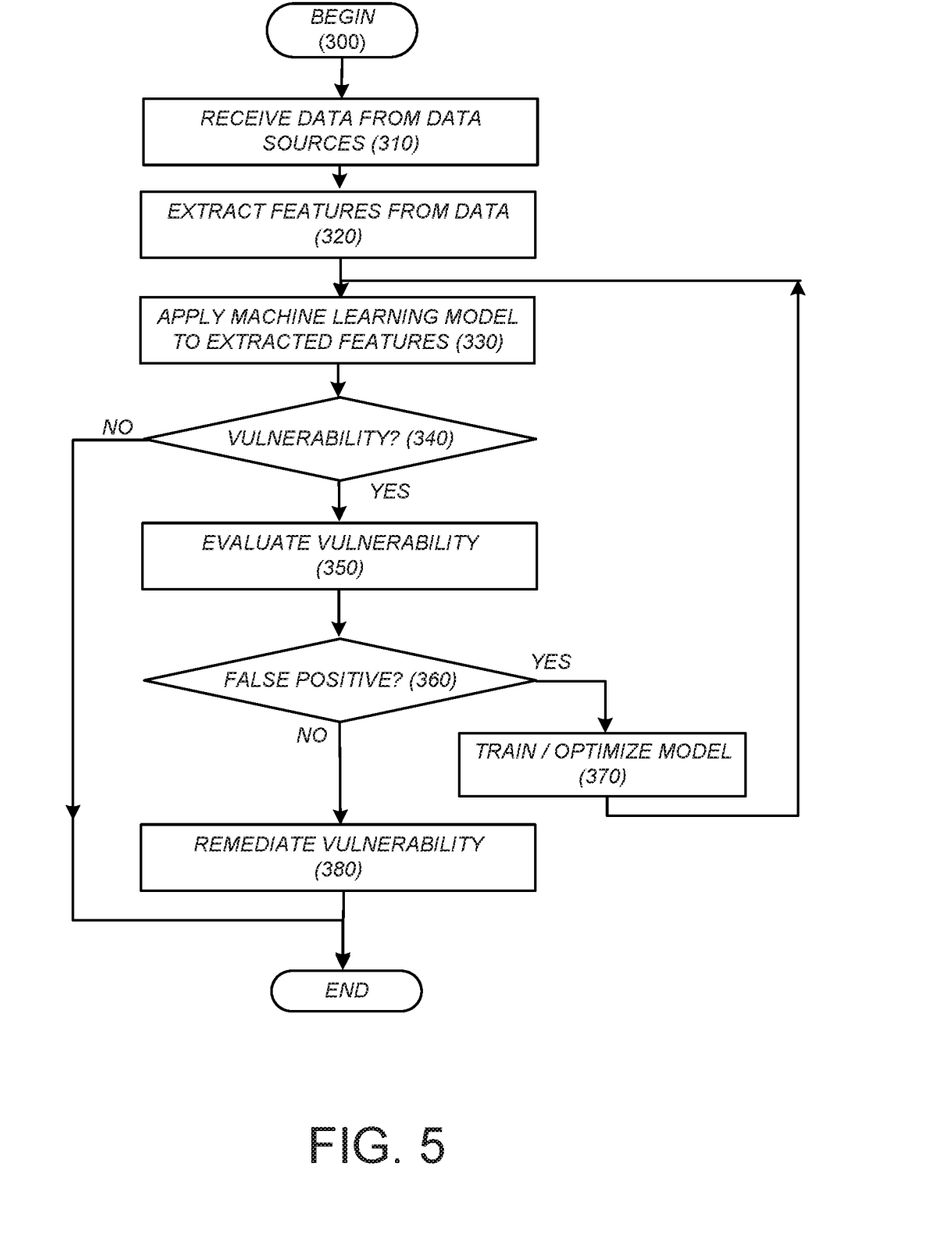
FIG. 5 shows an embodiment of a vulnerability assessment process that can be carried out by the network security system shown in FIG. 2.

The NS appliance 200 includes a computer-readable medium that can hold executable or interpretable computer code (or instructions) that, when executed by the GPU 210, or vulnerability assessor 280, or vulnerability remediator 290, cause the steps, processes and methods described in this disclosure to be carried out, including the processes 300 (shown in FIG. 5). The computer-readable medium can be included in the ROM 220, RAM 230, DD 240, or an external computer-readable medium connected to the NS appliance 200 via the network interface 250 or the I/O interface 260. The computer readable medium can include sections of computer code that, when executed by the GPU 210, vulnerability assessor 280, or vulnerability remediator 290, cause the process 300 (shown in FIG. 5) to be carried out, and all other process steps described or contemplated in the specification. It should be understood that in certain implementations, the vulnerability assessor 280, the vulnerability remediator 290, or both can comprise code executing in a hardware processor rather than these components being hardware components themselves.

A basic input/output system (BIOS) can be stored in a non-volatile memory in the NS appliance 200, such as, for example, in the ROM 220. The ROM 220 can include a ROM, an erasable programmable read-only memory (EPROM), or an electrically erasable programmable read-only memory (EEPROM). The BIOS can contain the basic routines that help to transfer information between computing resources within the NS appliance 200, such as during start-up.

The RAM 230 can include a high-speed RAM such as static RAM for caching data, a parallel random-access machine, or any random-access storage.

The disk drive (DD) 240 can include a hard drive, such as, for example, an enhanced integrated drive electronics (EIDE) drive, a serial advanced technology attachments (SATA) drive, or any other high capacity fast hard drive that might be available and that is suitable for application in the instant disclosure. The DD 240 can include an optical disk drive that can read/write from/to a compact disk read-only memory (CD-ROM) disk (not shown), or, read from or write to other high capacity optical media such as a digital video disk (DVD). The DD 240 can be configured for external use in a suitable chassis (not shown). The DD 240 can be connected to the backbone B2 by a hard disk drive interface (not shown) and an optical drive interface (not shown), respectively. The hard disk drive interface (not shown) can include a Universal Serial Bus (USB) (not shown) or an IEEE 1394 interface (not shown) for external applications.

The DD 240 and associated computer-readable media can provide nonvolatile storage of data, data structures, or computer-executable instructions. The DD 240 can accommodate the storage of any data in a suitable digital format. The DD 240 can include one or more apps that are used to execute aspects of the architecture described in this disclosure.

A variety of program modules can be stored in the DD 240, ROM 220, or RAM 230, including an operating system (not shown), one or more application programs (not shown), application program interfaces (APIs) (not shown), program modules (not shown), or program data (not shown). Any (or all) of the operating system, application programs, APIs, program modules, or program data can be cached in the RAM 230 as executable sections of computer code.

The network interface 250 can be connected to the computer network 10 (shown in FIG. 1) or one or more external networks (not shown). The network interface 250 can include a wired or a wireless communication network interface (not shown) or a modem (not shown). When communicating in a local area network (LAN), the NS appliance 200 can be connected to the LAN network through the wired or wireless communication network interface; and, when communicating in a wide area network (WAN), the NS appliance 200 can be connected to the WAN network through the modem. The modem (not shown) can be internal or external and wired or wireless. The modem can be connected to the backbone B2 via, for example, a serial port interface (not shown).

The I/O interface 260 can receive commands and data from, for example, an operator via a user interface device (not shown), such as, for example, a keyboard (not shown), a mouse (not shown), a pointer (not shown), a microphone (not shown), a speaker (not shown), or a display (not shown). The received commands and data can be forwarded to the GPU 210, vulnerability assessor 280, or vulnerability remediator 290, from the I/O interface 260 as instruction and data signals via the backbone B2.

The audio and video drivers 270 can include a graphics driver (not shown), a video adaptor (not shown), a video card (not shown), a sound card (not shown), or any other device necessary to render an image signal on a display device or an audio signal on a sound reproduction device (for example, speaker).

The network interface 250 can include a data parser (not shown) or the data parsing operation can be carried out by the GPU 210. Received data can be transferred from the network interface 250 to the GPU 210, the vulnerability assessor 280 or the vulnerability remediator 290. The network interface 250 can facilitate communication between the vulnerability assessor 280 or vulnerability remediator 290 and computing resources located internal (or external) to the computer network 10. The network interface 250 can handle a variety of communication or data packet formats or protocols, including conversion from one or more communication or data packet formats or protocols used by data sources to the communication or data packet formats or protocols used in the NS appliance 200.

The vulnerability assessor 280 can include a computing device or it can be included in a computing device as a module. Referring to FIGS. 2 and 4, the vulnerability assessor 280 can communicate with the network firewall 110, router 120, IPS 130, vulnerability scanner 140, database 150, DAD system 160, SAIM 170, or SAC device 180. The vulnerability assessor 280 can receive firewall log data, routing table data, IPS log data, vulnerability data, DAD system inventory data, SAIM inventory data, or SAC device report data from the computing resources in the network security system 100 (shown in FIG. 2) and generate a comprehensive and complete view of all nodes in the computer network 10 (shown in FIG. 1). The vulnerability assessor 280 can include a machine learning model such as, for example, an artificial neural network (ANN), a convolutional neural network (CNN), a recurrent neural network (RNN), a neural turing machine (NTM), a differential neural computer (DNC), a support vector machine (SVM), or a deep learning neural network (DLNN).

The vulnerability assessor 280 can analyze the received data and extract feature vector data. The vulnerability assessor 280 can perform regression analysis (for example, linear regression, polynomial regression, decision trees, support vector regression, or random forest), classification (for example, logistic regression, k-nearest neighbors, SVM, kernelSVM, NaiveBayes, decision-tree-classification, or random forest classification), clustering (for example, k-nearest neighbors, k-means, mixturemodel, DBSCn, Bayesian, Gaussian mixture model, agglomerative, mean-shift, self-organized maps, or Kohonen networks), association rule learning (for example, apriori, Euclat, FP-growth, deep restricted Boltzmann machine, deep belief network, or stacked autoencoder), dimensionality reduction (for example, principal component analysis, singular-value decomposition, T-distributed stochastic neighbor embedding, linear discriminant analysis, latent semantic analysis, factor analysis, independent component analysis, or non-negative metric factorization), or generative modeling (for example, Markov chains, genetic algorithms, variational autoencoders, generative adversarial networks, or Boltzmann machines).

According to a non-limiting embodiment, the vulnerability assessor 280 can include a neural network and an SVM. The vulnerability assessor 280 can analyze data received from the network firewall 110, router 120, IPS 130, vulnerability scanner 140, database 150, DAD system 160, SAIM 170, or SAC device 180 and extract a plurality of quantitative and qualitative features of the received data. The vulnerability assessor 280 can be initially trained based on, for example, a KDD-CUP-99 dataset, an NSL-KDD dataset, a CIDDS-001 dataset, or historical datasets stored in the database 150. The vulnerability assessor 280 can analyze each node N in the network 10 and each connection to the node and extract features such as, for example, source IP address, source port, destination IP address, destination port, transport protocol type, start time of communication session, duration of communication session, number of bytes transmitted, number of packets transmitted, class label (for example, normal, attacker, victim, suspicious or unknown), or type of attack (for example, probing, port scan, denial-of-service, unauthorized access from remote computing resource, or unauthorized access to root privileges), number of failed login attempts, number of file operations, number of connections from the same source or host within a predetermined timer period. The extracted features can be input to a machine learning model in the vulnerability assessor 280, which can identify or predict security vulnerabilities in computer network 10. The vulnerability assessor 280 can sort and prioritize the identified and predicted vulnerabilities based on, for example, severity, urgency, or potential impact to a node N or the network 10.

The vulnerability remediator 290 can include a computing device or it can be included in a computing device as a module. The vulnerability remediator 290 can include a machine learning model such as, for example, an ANN, CNN, RNN, NTM, DNC, SVM, or DLNN. The vulnerability remediator 290 can generate or select vulnerability remediation solutions for each identified or predicted vulnerability. Alternatively, the vulnerability remediator 290 can send vulnerability assessment data, including the identified or predicted vulnerability, to a computing resource of a security analyst to investigate and resolve the associated vulnerability.

FIG. 5 shows an embodiment of a vulnerability assessment process 300 that can be carried out for every node N in the computer network 10 (shown in FIG. 1). Referring to FIGS. 1 and 5, the process 300 can begin with the NS appliance 200 receiving data from various data sources for a node N31 in the computer network 10 (Step 310). The process 300 can be repeated for every node N in the network 10. The NS appliance 200 can include multiple computing devices that can carry out multiple instances of the process 300 in parallel, to simultaneously analyze data for multiple nodes N. The NS appliance 200 can receive data from the network firewall 110 (shown in FIG. 2), router 120, IPS 130, vulnerability scanner 140, database 150, DAD system 160, SAIM 170, or SAC device 180. The NS appliance 200 analyzes and vectorizes the received data for the node N31 and extracts feature vectors from the data (Step 320). The NS appliance 200 can generate a feature matrix 400 for the node N31 based on the analyzed data. The feature matrix 400 can be applied in the NS appliance 200 to generate a weighted vulnerability value that can predict a computing resource vulnerability at the node N31. The weighted vulnerability value can range between, for example, zero (0) and one (1), with "1" predicting a near certain likelihood of a vulnerability and "0" predicting a near certain likelihood of no vulnerability.

Figure 6:
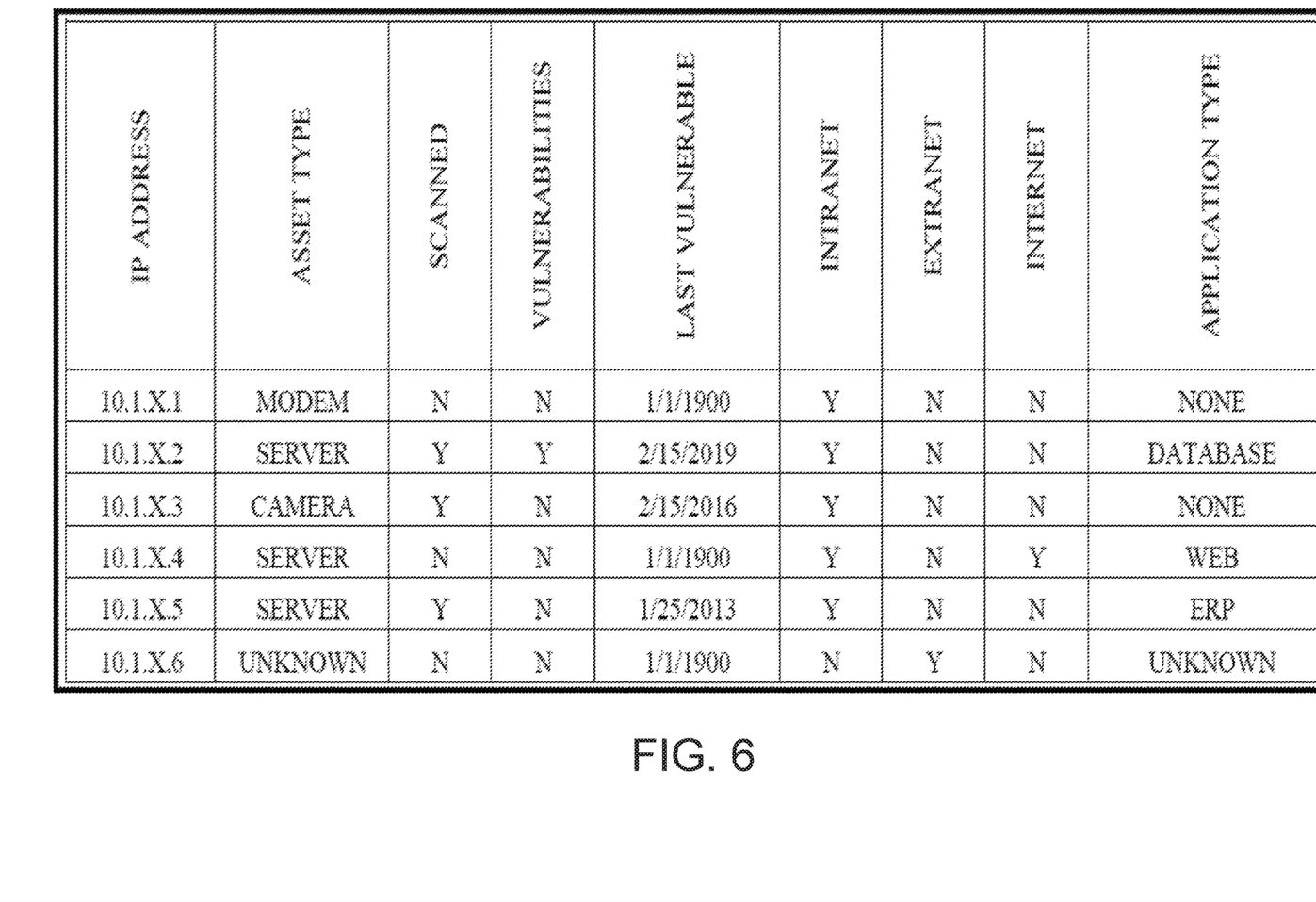
FIG. 6 shows an embodiment of a feature matrix that can be generated by the vulnerability assessment process.

FIG. 6 shows a non-limiting embodiment of the feature matrix 400 that can be generated by the NS appliance 200 for the node N31. A similar feature matrix can be generated for every node N in the network 10. As seen, the feature matrix 400 can include a plurality of fields, including, for example, an IP address field, an asset type field, a scanned field, a vulnerability field, a last vulnerable field, an intranet field, an extranet field, an Internet field, and an application type field. The IP address field can include the IP address of each computing resource that has a communication session with the node N31, such as, for example, a computing resource that is receiving data packets from, or transmitting data packets to the node N31. The asset type field can include the type of communicating device for each IP address, such as, for example, whether the device is a modem, a server, a camera, or unknown. The scanned field can include a flag (Y/N) that indicates whether the computing resource at each IP address has been scanned. The vulnerabilities field can include a flag (Y/N) that indicates whether a vulnerability has been reported for each IP address. The last vulnerable field can include a timestamp (for example, date and time) that indicates when the last vulnerability scan was performed for each IP address. The intranet field can include a flag (Y/N) that indicates, for each IP address, whether the computing resource is located in the intranet, in the computer network 10. The extranet field can include a flag (Y/N) that indicates, for each IP address, whether the computing resource is located outside of the computer network 10. The Internet field can include a flag (Y/N) that indicates, for each IP address, whether the computing resource is located on the Internet. The application type field can include, for each IP address, the software application type of the computing resource, for example, a null value ("none"), database, web, ERP, or unknown.

Referring back to FIG. 5, the extracted features can be input into a machine learning model in the NS appliance 200, which can apply machine learning model weighting to the feature vectors to predict a vulnerability at the node N31 (Step 330). As seen in the feature matrix 400 (shown in FIG. 6), the machine learning model can apply varying weights to the feature vectors, with greater weight being applied for feature vectors that represent a higher statistical likelihood of a vulnerability. The feature vectors can be prioritized and weighted based on the statistical likelihood of risk that a predicted vulnerability might pose to the node N31 or network 10. For instance, computing resources that are of unknown type (for example, IP address 10.86.54.36 in FIG. 6) can be weighted with the greatest weight value, since they are statistically most likely to pose the highest risk to the node N31 or network 10. Computing resources that are known but not scanned (for example, IP addresses 10.1.21.5 or 10.9.45.21 in FIG. 6) can be weighted with the next greatest weight value, followed by computing resources where no recent vulnerability has been reported (for example, IP address 10.9.45.21 in FIG. 6), and computing resources in high risk locations (for example, Internet facing nodes). The computing resources in middle risk locations (for example, extranet facing nodes) can be weighted less than high risk locations, but greater than lower risk locations such as, for example, intranet nodes. The machine learning model can be trained and optimized based on extracted feature vectors.

If the NS appliance 200 predicts a vulnerability for the node N31 (YES at Step 340), then node N31 can be evaluated (Step 350) to determine whether the vulnerability prediction is a false positive (Step 360). However, if the NS appliance 300 predicts no vulnerabilities for the node N31 (NO at Step 340), then the process 300 can end for node N31 and reinitiate and repeat for another node N (for example, node N32, shown in FIG. 1) in the network 10.

If the vulnerability prediction is determined to be a vulnerability (NO at Step 360), then vulnerability assessment data can be sent for remediation of the vulnerability at node N31 (Step 380). The vulnerability assessment data can be sent to a computing resource (not shown) at a security analyst location for analysis and remediation, which can be performed under control of a security analyst. Alternatively, the vulnerability assessment data can be sent to the vulnerability remediator 290 (shown in FIG. 4), which includes code executing in a processor which is configured to perform analysis and remediation without user intervention. The vulnerability assessment data can include an IP address, type of vulnerability, description of the vulnerability, and any other information that can be used to target and evaluate the vulnerability.

If the vulnerability prediction is determined to be a false positive (YES at Step 360), then the feature vectors can be applied to the machine learning model to train or optimize the model (Step 370), and Steps 330 through 360 carried out again, after training/optimizing the machine learning model with the feature vectors.

The terms "a," "an," and "the," as used in this disclosure, means "one or more," unless expressly specified otherwise.

The term "backbone," as used in this disclosure, means a transmission medium that interconnects one or more computing resources to provide a path that conveys data signals and instruction signals between the one or more computing resources. The backbone can include a bus or a network. The backbone can include an ethernet TCP/IP. The backbone can include a distributed backbone, a collapsed backbone, a parallel backbone or a serial backbone. The backbone can include any of several types of bus structures that can further interconnect to a memory bus (with or without a memory controller), a peripheral bus, and a local bus using any of a variety of commercially available bus architectures.

The term "communicating device," as used in this disclosure, means any hardware, firmware, or software that can transmit or receive data packets, instruction signals, data signals or radio frequency signals over a communication link. The communicating device can include a computer or a server. The communicating device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G, or 5G cellular standards, or Bluetooth. A communication link can include, for example, an RS-232, RS-422, RS-485, or any other suitable serial interface.

The terms "computer" or "computing device," as used in this disclosure, means any machine, device, circuit, component, or module, or any system of machines, devices, circuits, components, or modules which are capable of manipulating data according to one or more instructions, such as, for example, without limitation, a processor, a microprocessor, a graphics processing unit, a central processing unit, a general purpose computer, a super computer, a personal computer, a laptop computer, a palmtop computer, a notebook computer, a desktop computer, a workstation computer, a server, a server farm, a computer cloud, or an array of processors, microprocessors, central processing units, general purpose computers, super computers, personal computers, laptop computers, palmtop computers, notebook computers, desktop computers, workstation computers, or servers.

A "computing resource," as used in this disclosure, means any computing device, communicating device, computer program, computer application, application program interface, or any other software, firmware, or hardware that can receive, transmit or process an instruction or command or data.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read. The computer-readable medium can include a "Cloud," which includes a distribution of files across multiple (for example, thousands of) memory caches on multiple (for example, thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "database," as used in this disclosure, means any combination of software or hardware, including at least one application or at least one computer. The database can include a structured collection of records or data organized according to a database model, such as, for example, but not limited to at least one of a relational model, a hierarchical model, or a network model. The database can include a database management system application (DBMS) as is known in the art. The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and their variations, as used in this disclosure, mean "including, but not limited to," unless expressly specified otherwise.

The term "network" or "subnetwork," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, or the Internet, any of which can be configured to communicate data via a wireless or a wired communication medium. These networks can run a variety of protocols not limited to TCP/IP, IRC or HTTP.

The term "node," as used in this disclosure, means a physical or virtual location in a computer network that comprises a computing resource.

The term "server," as used in this disclosure, means any combination of software or hardware, including at least one application or at least one computer to perform services for connected clients as part of a client-server architecture, server-server architecture or client-client architecture. A server can include a mainframe or a server cloud or server farm. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

The terms "transmission," "transmit," "communication," "communicate," "connection," or "connect," as used in this disclosure, include the conveyance of data, data packets, computer instructions, or any other digital or analog information via electricity, acoustic waves, light waves or other electromagnetic emissions, such as those generated with communications in the radio frequency (RF) or infrared (IR) spectra. Transmission media for such transmissions can include subatomic particles, atomic particles, molecules (in gas, liquid, or solid form), space, or physical articles such as, for example, coaxial cables, copper wire and fiber optics, including the wires that comprise a system bus coupled to the processor.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical. In certain non-limiting embodiments, one or more process steps, method steps, or algorithms can be omitted or skipped.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications, or modifications of the disclosure.

What is claimed is:

1. A method for analyzing network security data from diverse data sources to predict and remediate a vulnerability at a node in a computer network, the method comprising:
   receiving network security data from a plurality of data sources;
   extracting feature vectors from the received network security data;
   applying a machine learning model to the extracted feature vectors to generate a weighted vulnerability value;
   predicting a computing resource vulnerability at a node in the computer network using the weighted vulnerability value;
   evaluating the predicted computing resource vulnerability;
   determining whether the predicted computing resource vulnerability includes a false positive prediction;
   responsive to a false positive prediction, optimizing weighting in the machine learning model based on the extracted feature vectors; and
   transmitting the predicted computing resource vulnerability to a computing device which is configured to remediate the predicted computing resource vulnerability.

2. The method in claim 1, wherein the plurality of data sources comprises at least one of:
   a network firewall;
   a router;
   an intrusion prevention system;

a vulnerability scanner;
a dynamic asset discovery system;
a static asset inventory manager;
a security analyst communicating device; and
a database.

3. The method in claim 1, wherein applying the machine learning model to the extracted feature vectors to generate the weighted vulnerability value comprises:
generating a feature matrix that prioritizes feature vectors based on a risk to the node or the computer network that each feature vector represents.

4. The method in claim 3, wherein the feature matrix comprises at least one of:
an IP address field;
an asset type field;
a scanned field;
a vulnerabilities field;
a last vulnerable field;
an intranet field;
an Internet field; and
an application type field.

5. The method in claim 4, wherein an unknown value in the asset type field is assigned a highest priority.

6. The method in claim 3, wherein the feature matrix includes feature vectors for all connections to the node.

7. The method in claim 6, wherein the connections to the node include a communication session that includes data packets transmitted to or from the node.

8. The method in claim 4, wherein the IP address field comprises an IP address of every computing resource connected to the node.

9. A non-transitory computer readable storage medium storing network security analysis and vulnerability prediction program instructions for causing a network security appliance to analyze network security data from diverse data sources to predict a vulnerability at a node in a computer network for remediation, the program instructions comprising the steps of:
receiving network security data from a plurality of data sources;
extracting feature vectors from the received network security data;
applying a machine learning model to the extracted feature vectors to generate a weighted vulnerability value;
predicting a computing resource vulnerability at a node in the computer network using the weighted vulnerability value;
evaluating the predicted computing resource vulnerability;
determining whether the predicted computing resource vulnerability includes a false positive prediction;
responsive to a false positive prediction, optimizing weighting in the machine learning model based on the extracted feature vectors; and
transmitting the predicted computing resource vulnerability to a computing device which is configured to remediate the predicted computing resource vulnerability.

10. The non-transitory computer readable storage medium in claim 9, the program instructions comprising the further step of:
generating a feature matrix that prioritizes feature vectors based on a risk to the node or the computer network that each feature vector represents.

11. The non-transitory computer readable storage medium in claim 10, wherein the feature matrix comprises at least one of:
an IP address field;
an asset type field;
a scanned field;
a vulnerabilities field;
a last vulnerable field;
an intranet field;
an Internet field; and
an application type field.

12. The non-transitory computer readable storage medium in claim 11, wherein an unknown value in the asset type field is assigned a highest priority.

13. The non-transitory computer readable storage medium in claim 10, wherein the feature matrix includes feature vectors for all connections to the node.

14. The non-transitory computer readable storage medium in claim 13, wherein the connections to the node include a communication of data packets transmitted to or from the node.

15. The non-transitory computer readable storage medium in claim 11, wherein the IP address field comprises an IP address of every computing resource connected to the node.

16. A network security system for analyzing network security data from diverse data sources to predict and remediate a vulnerability at a node in a computer network, the system comprising:
a plurality of network security data sources that monitor and log activities and events in the computer network, the network security data sources including two or more of a network firewall, a router, an intrusion prevention system, a vulnerability scanner, a dynamic asset discovery system, and a static asset inventory manager; and
a network security appliance that
receives network security data from the plurality of data sources,
extracts feature vectors from the received network security data,
applies a machine learning model to the extracted feature vectors to generate a weighted vulnerability value,
predicts a computing resource vulnerability at a node in the computer network using the weighted vulnerability value,
evaluates the predicted computing resource vulnerability,
determines whether the predicted computing resource vulnerability includes a false positive prediction,
responsive to a false positive prediction, optimizes weighting in the machine learning model based on the extracted feature vectors, and
transmits the predicted computing resource vulnerability to a computing device which is configured to remediate the predicted computing resource vulnerability.

* * * * *